April 28, 1964  J. W. NELSON ETAL  3,130,524
APPARATUS FOR CUTTING ANNULAR WALL ELEMENTS OF TUBULAR BODIES
Filed Dec. 7, 1961  2 Sheets-Sheet 1

Jerome W. Nelson
Fred A. DeSaw   INVENTORS

BY /s/ Edwin M. Thomas

PATENT ATTORNEY

April 28, 1964   J. W. NELSON ETAL   3,130,524
APPARATUS FOR CUTTING ANNULAR WALL ELEMENTS OF TUBULAR BODIES
Filed Dec. 7, 1961   2 Sheets-Sheet 2

Jerome W. Nelson
Fred A. DeSaw   INVENTORS

BY *Edwin M. Thomas*

PATENT ATTORNEY

United States Patent Office 3,130,524
Patented Apr. 28, 1964

3,130,524
APPARATUS FOR CUTTING ANNULAR WALL
ELEMENTS OF TUBULAR BODIES
Jerome W. Nelson and Fred A. De Saw, both of Columbus, Ohio, assignors, by mesne assignments, to Esso Research and Engineering Company, Elizabeth, N.J., a corporation of Delaware
Filed Dec. 7, 1961, Ser. No. 157,692
11 Claims. (Cl. 51—165)

The present invention relates to an apparatus for cutting materials such as the annular walls of tubular bodies such as pipes, tubes and other hollow cylindrical objects. The invention has particular application to the preparation of joints for welding in pipe lines and the like, but it is also applicable to other and related uses. It may, for example, also be used for cutting heavy sheets or plates of steel and other hard materials, or for cutting other shapes such as non-circular hollow bodies.

There has recently been developed a process for welding pipe lines in the field in a manner that is largely automatic. This process involves the aligning of successive joints of pipes, holding them in place, performing a preparatory cutting operation to obtain a welding groove of desirable proportions and uniformity, and finally effecting the welding by traversing a welding unit around the axis of the pipe. In this manner girth welds of a high degree of uniformity and of excellent quality can be produced more accurately and less expensively than in prior field welding methods.

A critical part of the automatic operation just referred to is the preparatory cutting. When adjacent sections of steel tube, which may be as large as 30, 36, 42 or even more inches in diameter, are brought into abutment, the cutting of the desired narrow groove to form a uniform kerf between the pipe ends is technically difficult. A high speed rotary abrasive cutter preferably is employed which must be driven and manipulated in such a way as to minimize its breakage and to obtain a high linear cutting rate at reasonable cost. Apparatus and process aspects of the operation just mentioned have been described in prior applications. A particular problem involves the control of the approach by the cutter towards, penetration through, and traverse around the pipe or tubular body while maintaining high cutting efficiency. This problem is complicated by the fact that abrasive cutting wheels or elements of the type normally preferred in this process tend to wear rather rapidly. Consequently, they have a constantly varying effective diameter. By effective diameter is meant the average effective cutting diameter since wheels of this type may tend at times to chip and break out small notches so as not to be perfectly round.

Obviously, with an effective cutter diameter which varies, the cutting rate and the nature of the cut may vary substantially to such an extent that satisfactory cutting is not accomplished without detailed manual control.

The present invention makes it possible to proceed automatically because it provides automatic control and compensation means, whereby satisfactory cuts may be effected regardless of wide variations in diameter of the cutting wheel or element.

Hence, a primary object of the present invention is to improve the control over high speed rotary cutters of the type described. A further object is to obtain precise control of depth of penetration. Additional objects involve the control of the approach rate of the cutter as it is brought towards the work, control of the penetration rate to avoid undue cutter breakage and to facilitate automatic operation, and constant penetration depth control to compensate for wear occurring during a single cutting operation.

The invention will be more clearly understood by reference to the attached drawings wherein.

Figure 1:
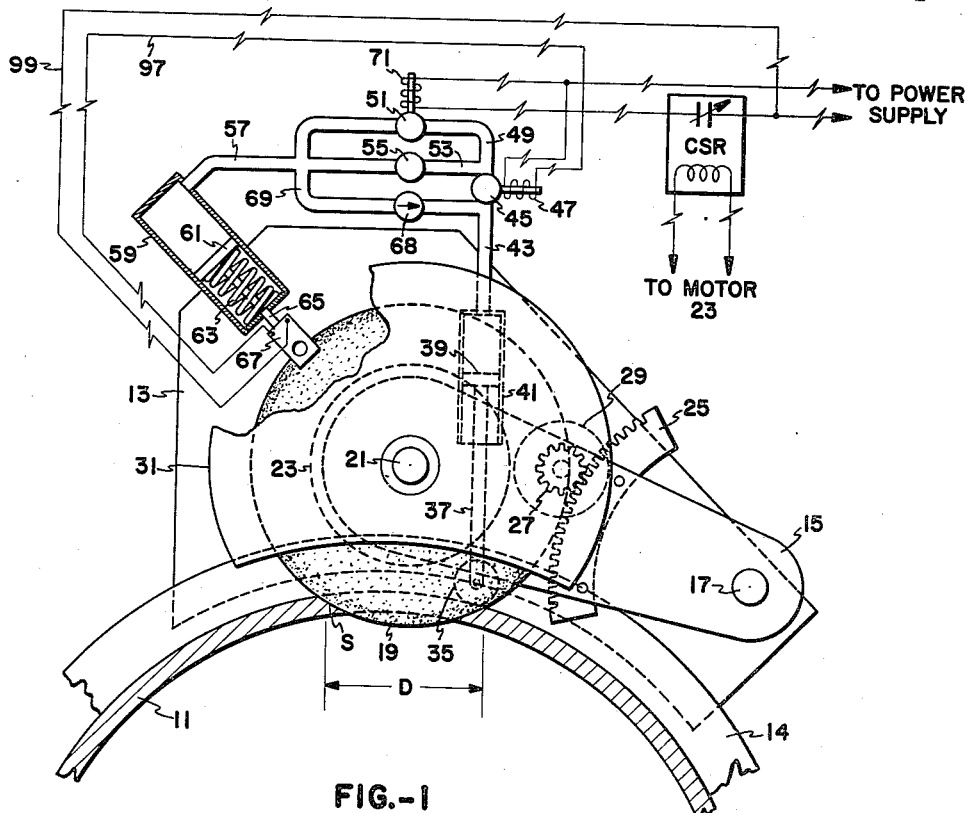
FIG. 1 is a schematic view in elevation of a preferred embodiment.

Referring first to FIG. 1, there is shown a section of tube 11 which may be a field pipe line or a piece of pipe to be joined to another piece as in "double jointing" preparatory to field installation. It may be a tubular body of any suitable type. The cutting apparatus comprises a carriage 13 adapted to support the cutter mechanism and also to traverse it about the axis of the tubular body to perform a cutting operation completely around the tubular wall. A guide track or frame 14 of suitable form guides carriage 13. A rockable arm 15, mounted on a pivot 17 on the carriage frame, supports a cutting wheel 19 mounted on an axis 21 in arm 15. A suitable drive means 23, such as an electric or pneumatic motor, is provided to drive wheel 19 at high speed. Arm 15 is provided with a rack 25 engaged by a pinion 27 which may be driven in either direction by a motor 29. Obviously, rotation of the rack 27 will swing the arm 15 about axis 17 to bring the cutting wheel towards or away from the tubular body 11. For safety the cutting wheel is preferably enclosed in a guard or housing 31 mounted coaxially with the cutter on arm 15.

For optimum welding it is desirable that the end portion of the freshly cut prepared surface have a ramp-like slope as indicated at S, FIG. 1. While the precise slope will vary somewhat with the diameter of the cutting wheel, the apparatus is designed to penetrate substantially as shown in FIG. 1. The penetration preferably spans a distance D which, within reasonable limits, gives the desired ramp slope S. A contact or depth controller, in the form of a small roller 35, is mounted on the lower end of a slidable piston rod 37. This piston rod carries a piston 39 in a cylinder 41 and is normally urged downwardly by hydraulic pressure above the piston. Above the piston head 39 the cylinder is filled with hydraulic fluid, such as oil, so that upon upward movement of the piston 39 relative to cylinder 41, hydraulic fluid will be forced outwardly through a line 43 through a depth limit control cut-off valve 45. This valve is normally closed unless opened by energization of a solenoid 47 in a manner to be explained later. Assuming valve 45 is open, hydraulic fluid flows through line 49 and through a throttling valve 51. A branch line 53 permits part of the fluid to by-pass valve 51 and flow through an adjustable needle valve 55. The two lines are reunited and continue on through line 57 to a cylinder 59 which contains a piston 61 normally urged upwardly by a spring 63. Piston 61 has a piston rod 65 which carries a control device 67 shown in greatly enlarged scale in FIGS. 2 and 3.

The main throttling valve 51 can be adjusted to permit a rate of flow of fluid suitable for allowing the cutter 19 to approach the wall to be cut at a suitable approach speed. This valve is controlled by a solenoid 71 which holds it open only as long as the solenoid is active. Solenoid 71 is connected to a current sensitive relay CSR controlled by the magnitude of current in motor 23. During the approach of the cutter by counterclockwise movement of arm 15 around pivot 17, relay CSR remains closed, activating the solenoid 71 to hold valve 51 open. Under these conditions, oil can flow fairly rapidly from cylinder 41 to cylinder 59. However, when the cutter approaches the surface of the pipe 11, the approach rate is too great for the penetrating speed of the cutter and might result in damage to the cutter disc if not slowed down. This is accomplished by closing valve 51 as next described.

As motor 23 rotates the cutter before touching the work, there is no particular resistance, other than the freely rotating cutoff wheel 19; however, armature current is low. When the cutter wheel 19 contacts the pipe 11 however, a considerably greater torque is required instantly to rotate the cutter as it cuts through the pipe wall. Armature current in motor 23 then increases abruptly. This increase activates CSR and opens the circuit to solenoid 71, and valve 51 closes at once. For the remainder of its descent, the oil from cylinder 41 now must flow only through the needle valve 55 and the bypass line 53. This slows down and controls the approach rate so that the rotating cutter can successfully penetrate the pipe wall without breaking. In effect, the valves 51 and 55 provide for a controlled rapid approach of the cutter to the work, followed by a controlled slower rate of penetration which does not exceed the capacity of the cutting disc to penetrate the wall. A check valve 68 in a line 69 which bypasses valves 45, 51 and 55 permits hydraulic fluid to flow back to cylinder 41 when the cutter is lifted away from the work. Spring 63 drives piston 61 upwardly.

Figure 2:
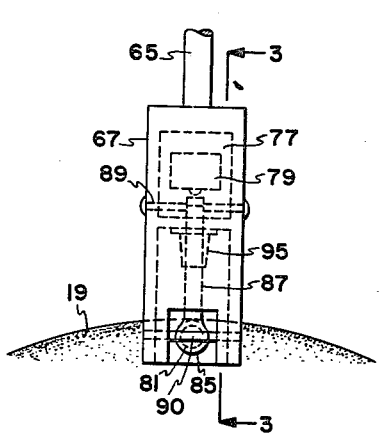
FIG. 2 is greatly enlarged detail of a control element shown in FIG. 1.
Figure 3:
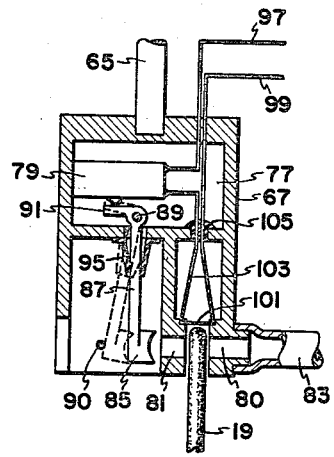
FIG. 3 is a transverse sectional view taken substantially along the line 3—3 of FIG. 2 showing the detailed mechanism in the control element.

Referring now to FIGS. 2 and 3, the control element 67, which senses the wheel diameter and controls depth of its penetration into the work, comprises a hollow housing member containing an upper compartment 77. This compartment contains a normally open microswitch 79. The lower part of element 67 includes a bifurcate portion adapted to straddle the edge of cutting wheel 19. An opening 80 to permit release of compressed gas is provided in one leg, and an aligned opening 81 is in the other leg. A stream of gas such as air, nitrogen, carbon dioxide, etc. is supplied to the control through an inlet line 83 and, in the absence of cutter wheel 19, the gas stream passes out of outlet opening 80 and through opening 81. It strikes a rockable target or pendulum element 85 on emergence from opening 81. The target is mounted on an arm 87 pivoted on a pin 89 and carrying a laterally extending switch actuating arm 91. A stop pin 90 limits the swing of pendulum 85. When a jet of air or other gas strikes the target or pendulum 85, the arm 87 swings clockwise and the lateral arm 91 will close the normally open switch 79. A flexible sleeve or seal member 95 permits the target or pendulum carrying arm 87 to swing quite freely while sealing the upper compartment against dust and dirt associated with the cutting operation.

The switch 79 has electric leads 79 and 99, the latter passing down into the bifurcate gap which accommodates the cutter wheel and being stretched laterally across the gap as indicated at 101, thence returning as indicated at 103 to the terminal of the switch. The wire segment 101 is a safety element which will be cut if wheel 19 penetrates unduly. A seal 105 keeps dust and debris out of the switch compartment which otherwise might soon be filled with cuttings, abrasive dust, etc.

The function of the control element will now be explained. As the cutter is lowered towards the pipe or hollow member 11 by rotation of pinion 27 against rack 25, the contact roller 35 rests on the pipe wall. Further movement presses piston 39 upwardly with respect to cylinder 41 causing hydraulic fluid to flow through the valve 45. Valve 45 is kept open as long as the gas stream through inlet 83 is holding target 85 (FIG. 3) in the dotted line position. Hence hydraulic liquid flows through the line and through valves 51 and 55, and pushes the control member 67 towards the center of the cutter wheel. This movement is relatively rapid. As cutting position is reached, i.e., as the cutter contacts pipe wall 11, the resistance of the pipe wall 11 to cutter 19 impedes motor 23 and the motor current immediately increases. This increase of current opens the relay CSR and deactivates solenoid 71. Valve 51 closes but valve 55 remains open and the cutter penetrates the work piece at a slower controlled rate as hydraulic fluid from cylinder 41 flows only through valve 55 into cylinder 59. This moves piston 61 to push control member 67 towards the cutter wheel 19. As soon as control member 67 straddles the cutter wheel 19, FIG. 3, and the edge of the wheel interferes with the gas jet impinging on the target 85, the latter swings to the full line position, permitting switch 79 to open. When this occurs, solenoid 47 is deactivated and valve 45 snaps shut. Since the hydraulic fluid is substantially incompressible, the cutter cannot move farther into the work piece, even though motor 29 driving rack 25 attempts to impel it further. This motor is of a type which can be stalled without injury and it stalls during most of the cutting operation due to the closing of valve 45 and the resistance of the piston rod 37 and its roller 35.

From the foregoing, it will be understood that the cutter approaches the work rapidly, slows down to penetrate through the pipe wall, and then the penetration stops when the desired depth of cut has been reached. At this point, the ramp S has been formed and will be a suitable surface to start the automatic welding in the welding process mentioned earlier. When the time comes for the cutter to be moved away from the work, motor 29 reverses, lifting the cutter radially away from the pipe. The welding step then can be carried out.

After the ramp S is formed by the cutoff wheel, the cutoff wheel is moved around the pipe to prepare the welding groove. As the groove is being prepared, the cutoff wheel 19 is being worn away. The apparatus compensates for the wear in the following manner. As the cutoff wheel 19 wears away, the target 85 is exposed to the stream of gas and closes switch 79. When this occurs, solenoid 47 is activated and valve 45 opens. This allows the cutter to move inward at a controlled rate until the edge of the wheel again interferes with the gas jet impinging on the target. The cycle repeats itself as required to correct for the cutoff wheel wear and to maintain the edge of the cutoff wheel in proper relationship with the pipe being prepared.

Figure 4:
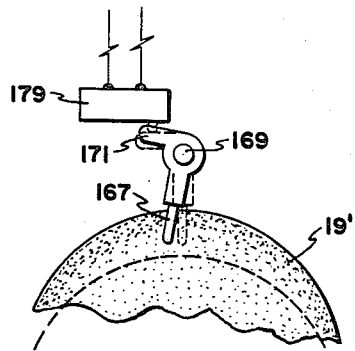
FIG. 4 is a diagrammatic view of the modification of the control element together with some associated parts.

Fig. 4 illustrates a variation where the windage created by the rotating cutter wheel 19' actuates a bifurcate target 167 pivoted on a pin 169 and carrying a lever 171 which closes a microswitch 179. It will be understood that this control accomplishes the same function as elements 67, 79, etc. of FIG. 3.

Figure 5:
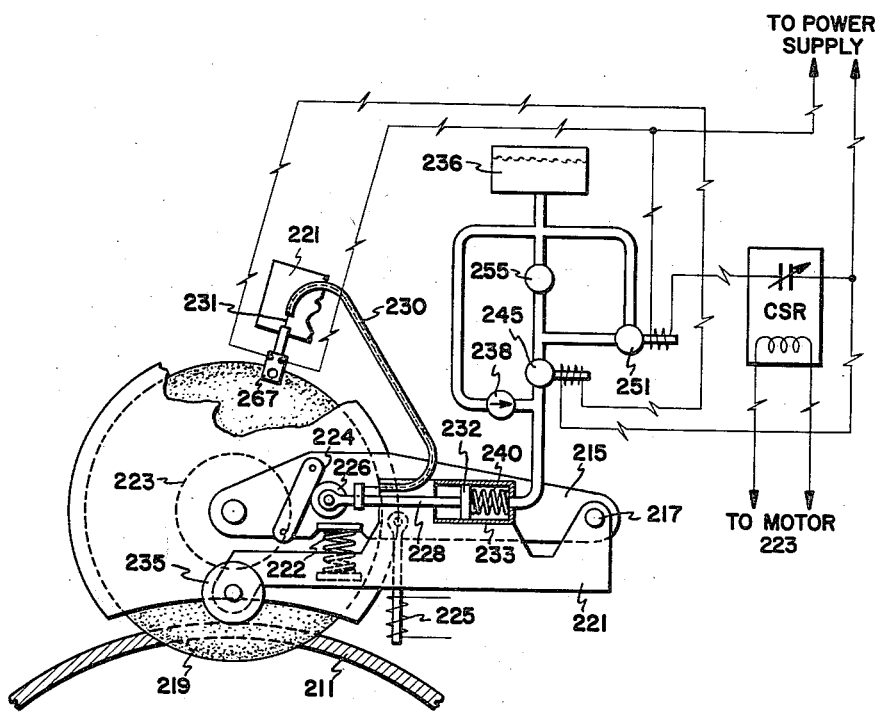
FIG. 5 is another modification of the cutter controls and operating mechanism.

Another modification is shown in FIG. 5. In this case a mechanical linkage is employed to move the control element 267 toward the axis of the cutter wheel 219. The latter is mounted on a pivoted arm 215 pivoted on a suitable shaft 217. A reversible solenoid 225 performs the same function as rack 25 and pinion 27 in FIG. 1, that is, upon being suitably activated, it swings the arm 215 downwardly about pivot 217, bringing the cutter towards the work piece 211. A separately pivoted arm 221 mounted also on pivot 217, carries a feeler or contact roller 235 similar in function to roller 35, FIG. 1. A compression spring 222 tends normally to hold the arms 215 and 221 apart. Activation of solenoid 225 compresses this spring and draws arm 215 towards and alongside of arm 221. A cam element 224 mounted rigidly on arm 215 contacts a roller 226 mounted on a sliding bar or rod 228. The latter connects to a Bowden wire or cable 231 passing through a shield or carrier 230 and connecting to the control element 267. Also at its opposite end the sliding bar or rod 228 carries a piston 232 which forces hydraulic fluid through valves 251 and 255. These are similar in function to valves 51 and 55, FIG. 1. Fluid passing these valves goes into a reservoir 236 and returns to the cylinder 233 via check valve 238 when piston 232 is withdrawn to the left. A spring 240 pushes piston 232 to the left when the cutter is withdrawn. Cylinder 233 is mounted rigidly to arm 221.

With this arrangement, assuming that a cut is to be made, the solenoid 225 (which also may be suitably dampened by a dashpot if desired) draws arm 215 downwardly, causing cam 224 to push roller 226 to the right. As this occurs, fluid passing through the valves limits the approach speed and as valve 251 is closed (by means not shown but similar to elements 71, etc., FIG. 1), the penetration speed of the rotating wheel 219 cutting through the pipe wall is slowed, as controlled by the needle valve 255. Needle valve 255, like valve 55 of FIG. 1, can be adjusted to obtain the precise penetration rate desired.

Movement of roller 226 to the right pushes the Bowden cable 231 through its sheath 230, projecting the control device 267 astride the cutting wheel. A gas jet blowing across the gap is impeded when it reaches the edge of the wheel, and control means similar to that of FIG. 3 closes the valve 245, preventing further approach of the wheel towards the work.

An additional safety factor resides in the wire 101 which crosses the path above the cutter wheel 19, FIG. 3. In case the gas jet mechanism should fail to open switch 79 and the wheel continues to cut further into the work, the wheel 19 will sever line 101, thus deactivating the switch and closing valve 45. As a matter of fact, the device is designed to "fail safe" if any of the following occurs: (a) the air supply (or other gas) should fail; (b) the electric power fails, e.g., at valve 45 or 245; (c) if dirt or dust prevents proper operation of the control mechanism, the safety wire 101 will be cut.

The modification shown in FIG. 4 using the wind created by the rotating wheel is not quite as accurate in operation as the other controls illustrated.

In addition to cutting circular pipe and the like, the cutter mechanism and the depth control device 67, etc., can be used for cutting flat materials, rectangular tubes, housings and other shapes. Hence the control principle is not limited to pipe line cutting, although this is an important use. The welding process, for which the cutting mechanism is particularly designed, is applicable to flat welding.

It will be obvious that the foregoing description relates to particular embodiments and is merely representative. Certain departures may be made therefrom within the clear teachings of the invention and, therefore, in order to fully appreciate the spirit and scope of the invention reference should be made to the appended claims in which what is claimed is:

1. Apparatus for cutting through a material to a desired depth, comprising in combination a rotary cutter which is subject to wear and consequent variation in effective diameter, means for rotating said cutter about its own axis, means for moving said cutter bodily towards and away from the material to be cut, means for guiding the cutter relative to said material along a line to be cut, and means for limiting to a predetermined depth the penetration into said material regardless of the effective diameter of said cutter.

2. The combination according to claim 1 wherein said limiting means comprises a means for sensing the position of the circumference of said rotary cutter.

3. In combination, a rotary cutter adapted to be brought into contact with a body of material to be cut, to penetrate said body and to be traversed relatively to said body while cutting along a predetermined path, and means including a device for sensing the periphery of said cutter for accurately controlling the depth of said penetration regardless of wear of said cutter.

4. The combination according to claim 3 including means for controlling the rate of penetration as well as its depth.

5. In apparatus for cutting a body having an annular wall, the combination which comprises a rotary cutter of frangible material which has a relatively high wear rate and consequently may vary substantially in effective diameter during normal usage, means for driving said cutter at high speed around its own axis, means for moving the cutter towards said body for penetration therein to form a cut through said annular wall, regardless of cutter diameter, means for guiding said cutter around the axis of said body, and means for controlling the rate of said penetration.

6. The combination according to claim 5 wherein the control means include a hydraulic control means for completely stopping penetration at a predetermined depth.

7. A penetration depth control means for a rotary abrasive cutting element which is subject to wear and consequent variation in effective diameter, and hence to a normally variable penetration, which comprises a sensing device for sensing the effective diameter of said element and means controlled by said device for causing penetration by said element in response to said sensing, whereby substantially constant penetration is obtained regardless of wear.

8. Means according to claim 7 wherein the sensing device comprises means for detecting impedance of a stream of elastic fluid to sense the effective diameter.

9. Means according to claim 7 wherein the sensing device comprises a pivoted target and means for varying the position of said target to sense the effective diameter.

10. An apparatus for cutting through a material to a desired depth, said apparatus comprising in combination:
(A) a rotary cutter subject to a decrease in diameter,
(B) means for rotating said cutter about its own axis,
(C) means for moving the cutter relative to said material along a line to be cut,
(D) means for moving said cutter bodily towards material to be cut,
(E) sensing means for detecting a variation in effective diameter of the cutter,
(F) a depth controller comprising a roller mounted on the end of a piston rod, which carries a piston in a cylinder, said depth controller being operably attached to the cutting apparatus so as to be able to force the cutter away from the material being cut, and
(G) actuating means for changing the position of said piston rod in response to a signal from said sensing means.

11. An apparatus according to claim 10 wherein said sensing means comprises means for detecting impedance of a stream of elastic fluid, said impedance being caused by said cutter blocking the stream of said elastic fluid.

References Cited in the file of this patent

UNITED STATES PATENTS

| 961,969 | Klingloff | June 21, 1910 |
| 2,961,808 | Dunigan | Nov. 29, 1960 |
| 2,994,994 | Lonaberger | Aug. 8, 1961 |

FOREIGN PATENTS

| 481,021 | Great Britain | Feb. 28, 1938 |
| 697,949 | Great Britain | Sept. 30, 1953 |